Jan. 27, 1948.    E. LABIN ET AL    2,434,936
MODULATION SYSTEM
Filed Aug. 24, 1942    2 Sheets-Sheet 1
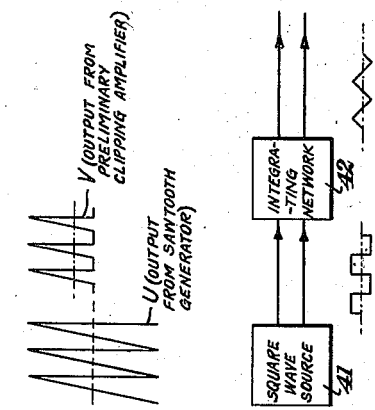
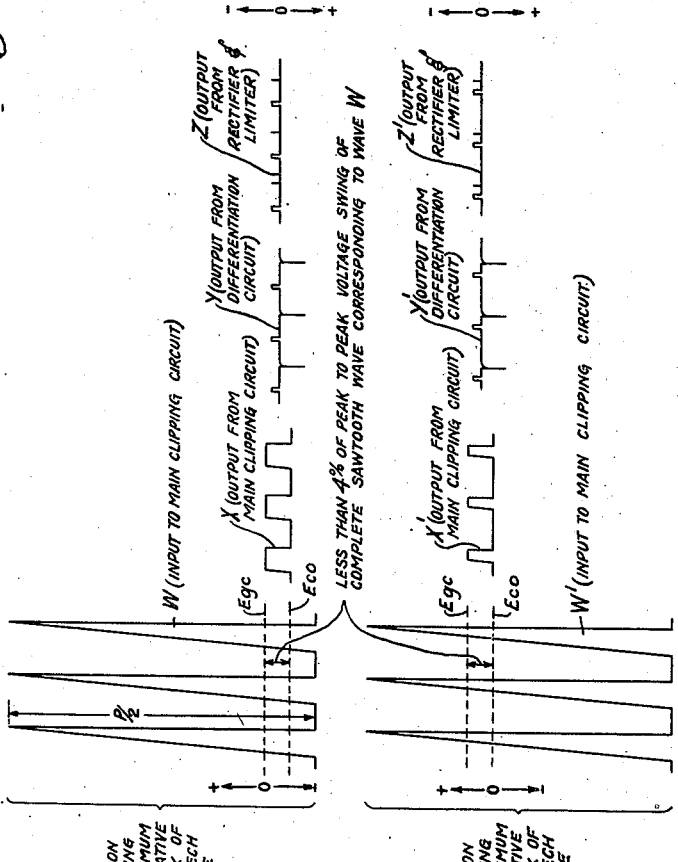
INVENTORS
EMILE LABIN
DONALD D. GRIEG
BY
R. F. Morris
ATTORNEY Jan. 27, 1948.    E. LABIN ET AL    2,434,936
MODULATION SYSTEM
Filed Aug. 24, 1942    2 Sheets-Sheet 2
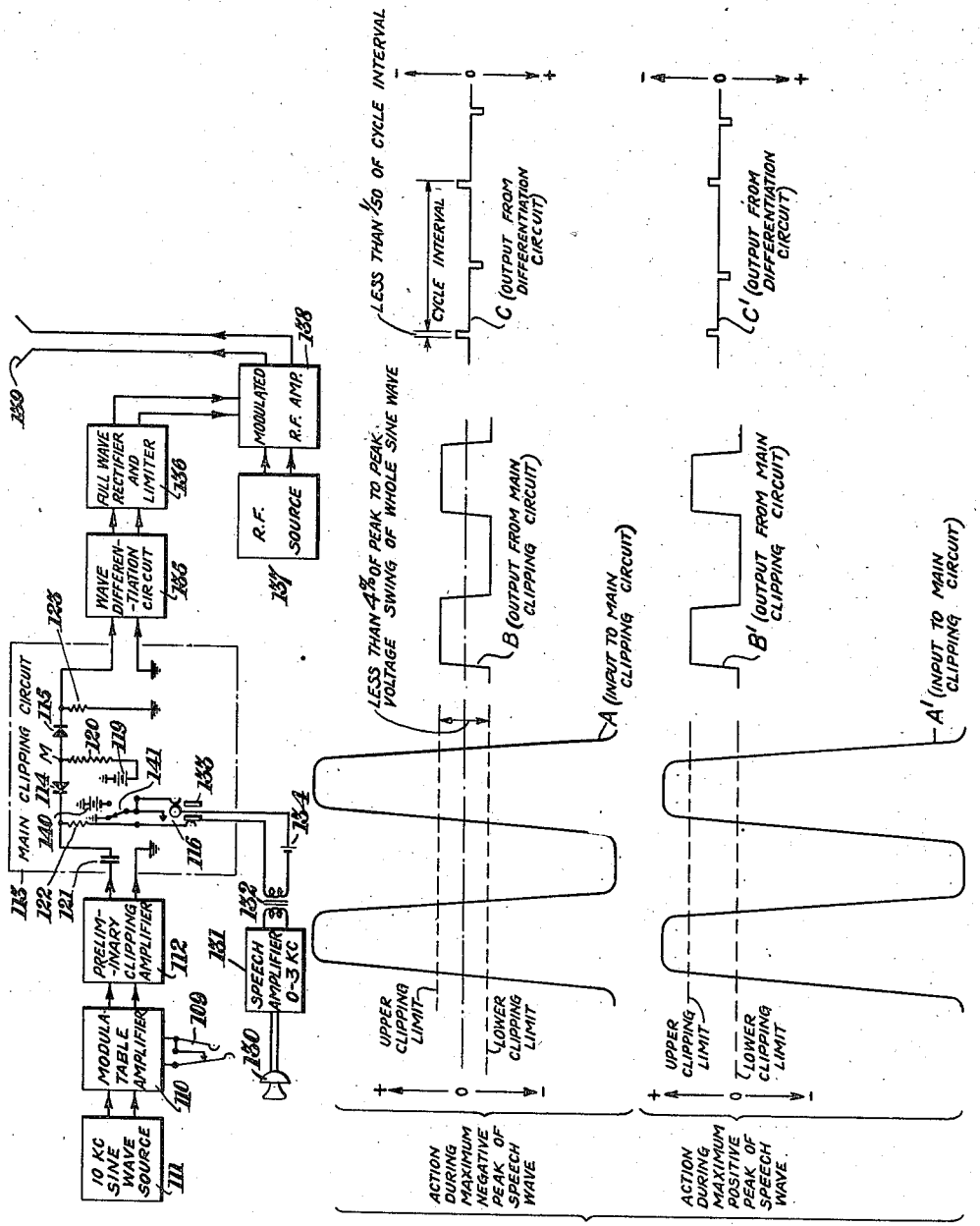
INVENTORS
EMILE LABIN
DONALD D. GRIEG
BY
ATTORNEY Patented Jan. 27, 1948

2,434,936

UNITED STATES PATENT OFFICE 2,434,936

MODULATION SYSTEM

Emile Labin, New York, and Donald D. Grieg, Forest Hills, N. Y., assignors to Federal Telephone and Radio Corporation, a corporation of Delaware Application August 24, 1942, Serial No. 455,898

9 Claims. (Cl. 179—171.5)

The present invention relates to pulse generation systems and more particularly to systems for generating time modulated pulses for use in communication systems and for other uses.

Several types of systems have been proposed for effecting communication by transmitting a number of pulses of current, the exact times of transmission of such pulses being controlled in accordance with the speech or other intelligence to be transmitted. In some cases the pulses of current are themselves transmitted to a distance over wires, but in other cases they are used to modulate carriers so as to produce brief wave trains generally referred to as carrier pulses. Such systems of communication have been described in U. S. Patents 2,266,401, 2,256,336, 2,265,337, 2,262,838, and in copending U. S. applications 386,282 and 425,108, respectively filed on April 1, 1941, by E. Labin and on December 31, 1941, by E. Deloraine and E. Labin, as well as in a large number of other foreign patents and applications. In accordance with the systems heretofore proposed, the generation of time modulated pulses was effected either by means of special vacuum tubes having cam-like target or masking means cut to a predetermined shape, or by providing multivibrator arrangements controlled by resistance/condenser time constants and capable of being influenced by the modulating signals so as to vary the vibration rate.

It is an object of the present invention to provide a simpler, more reliable, and more economical method of generating time modulated pulses.

More particularly, it is an object to provide a system for generating time modulated pulses by the use of ordinary types of circuit components without requiring specially designed tubes.

It is a further object to provide such a system for generating time modulated pulses which shall be capable of being stabilized by a master source of fixed waves, such as a sine wave oscillator or a stable unmodulated relaxation oscillator.

More particularly, it is an object to provide such a system wherein the time of the generated pulses is controlled by a fixed unmodulated wave.

Other objects of the invention will readily appear to those skilled in the art from the following detailed description of the invention, taken together with the annexed drawings, in which;

Fig. 1 is a schematic diagram of a time modulation transmitter embodying one form of our invention;

Figs. 2 and 3 are sets of curves used for explaining the operation of Fig. 1;

Fig. 4 is a schematic representation of an arrangement for producing triangular waves which may be substituted for a portion of the system of Fig. 1;

Fig. 5 is a schematic representation of a clipping circuit which may be substituted for the clipping circuit shown in Fig. 1;

Fig. 6 is a schematic diagram of a time modulation transmitter embodying a modified form of our invention; and Fig. 7 is a set of curves used in explaining the operation of the system of Fig. 6.

Referring more particularly to Fig. 1, 10 is a saw-tooth wave generator synchronized by a sine wave oscillator 11 and connected to deliver its saw-tooth output via a preliminary clipping amplifier 12 to the main clipping circuit 13.

As shown in Fig. 1, this main clipping circuit 13 comprises a conventional pentode 14 connected in the usual resistance-coupled fashion but preferably having a high resistance 15 in series with its control grid lead and having a shorting-type jack 16 connected in the control grid return lead. Except for this high resistor 15 and the jack 16, the circuit connections of the pentode 14 are essentially conventional, comprising on the input side the usual coupling condenser 19, and the usual grid bias resistor 20, the latter being connected through jack 16 to the usual C battery 21. The output side of the circuit comprises the usual load resistor 22 connected to the usual plate supply battery 23, as well as a conventional output coupling condenser 24. The screen is biased positively by screen battery 25 in the usual manner. Preferably, the screen voltage battery 25 (and if desired the plate battery 23, also) is of lower potential than usual so that only a small negative control grid voltage is required for producing cut-off. The C bias battery 21 may, for convenience, be assumed to provide just sufficient potential to produce cut-off.

In addition to the input applied from saw-tooth generator 10 via amplifier 12, an additional lower frequency modulating signal is applied to the circuit 13 through the jack 16. As illustrated in Fig. 1, the modulating input consists of speech from a telephone transmitter 30 which is applied via amplifier 31, transformer 32, and plug 33 to jack 16 of the main clipping circuit 13, being thus applied to the control grid of pentode 14 in series with battery 34.

The output from the main clipping circuit 13 is fed through a wave differentiation network 35 which may be of any known type and thence through a rectifying and limiting circuit 36, which may also serve for amplification if desired. The output obtained from circuit 36 is then applied to modulate a radio frequency amplifier 38, excited from a suitable radio frequency source 37, so as to produce a train of carrier waves responsive to each modulating impulse received from the circuit 36. The R.-F. output of amplifier 38 is then applied to antenna 39 for radiation to a distant point.

The operation can best be understod by consideration of the curves of Figs. 2 and 3 in connection with the circuit of Fig. 1. The sawtooth generator 10 produces waves such as shown in curve U of Fig. 3. The preliminary clipping amplifier 12 then cuts off the bottom portions of these waves so as to pass only a wave such as shown in curve V of Fig. 3, commonly called a "blanked saw-tooth wave." Such wave V is then applied via a coupling condenser 19 to the control grid of pentode 14, being thus superposed upon the speech voltage and the bias voltages from batteries 34 and 21. It may be assumed, for convenience, that the voltage of battery 34 is just equal to the peak voltage of the loudest speech waves arriving over transformer 32. Thus the tip of plug 33 is positive with respect to the sleeve thereof at all times excepting on the extreme negative peaks of the speech waves (at which time it just reaches zero potential with respect to the sleeve). For convenience, it may be further assumed that the potential of battery 21 is polarized to bias the control grid positively instead of negatively and is sufficiently large that when this voltage is superposed upon the voltage of curve V, the most negative portion of the curve V extends only slightly below cut-off. If this is so and if it be assumed that at the moment under consideration the speech signal arriving from transformer 32 has its maximum negative value, then the resulting wave applied to the control grid of pentode 14 will be positioned as shown in curve W of Fig. 2 with its most negative portion only slightly below the cutoff threshold $E_{co}$. As previously described, the screen voltage (and perhaps also the plate voltage) of the pentode 14 is of low value so that the cutoff threshold $E_{co}$ is only a very few volts below the grid current threshold $E_{gc}$. Accordingly, as can be seen from curve W of Fig. 2, most of the voltage wave applied to the control grid will lie above this grid current threshold.

Considering now in greater detail the action of the pentode in response to the applied wave W shown in Fig. 2, it will be seen that when this wave starts upward from its lowest value below $E_{co}$ there is at first no response until the wave passes above the threshold $E_{co}$. Then as the wave continues to rise from $E_{co}$ toward $E_{gc}$ an amplified voltage wave is produced in the output circuit of the pentode, the form of this voltage wave being shown in curve X of Fig. 2. (Actually this output voltage wave is of opposite sign from the input wave, but to facilitate comparison of the curves it is shown as if there were no reversal of sign.) When the input voltage wave W passes above the upper threshold of $E_{gc}$, the output voltage of the pentode abruptly ceases to vary by virtue of the following: The commencement of grid current flow causes a voltage drop to appear across resistance 15 which subtracts from the driving grid voltage thus effectively limiting the grid swing at this point. If the driving source 12 is of substantially high impedance, grid current flow tends to impose a high load as to overload the driving stage thus aiding this limiting action.

The output voltage wave X from the pentode 14 will therefore correspond exactly to those portions of curve W which lie between $E_{co}$ and $E_{gc}$ as can be plainly seen by comparing curves W and X in Fig. 2. To facilitate comparison of these and the other curves, the curves X, Y, Z are all shown with opposite polarity from the curve W, as indicated by the designations "—0+" at the right of curve Z. Also, these three curves have their zero line offset with respect to the zero line of curve W to further facilitate comparison of curves X and Y. In addition, it will be noted that the curves are drawn as if no amplification occurred in any of the stages although it is clear that amplification will inherently occur in the clipper stage and may be included in other stages.

The output wave X is next differentiated in network 35 to yield a series of alternately positive and negative pulses, as shown in curve Y of Fig. 2. The upward (i. e. negative) pulses corresponding to the inclined leading edges of the nearly square waves X, have a duration theoretically corresponding to the duration of these inclined rising sides of the wave X, while the downward pulses produced by the vertical trailing edges of the nearly square waves X have theoretically greater amplitude and zero duration. These differences (which are illustrated on an exaggerated scale in curve Y) may be actually made very minute by proportioning the circuit so that the "grid base" (i. e. the voltage difference between the thresholds $E_{co}$ and $E_{gc}$) is negligibly small in comparison with the height of the saw-tooth wave U as measured at the control grid of the pentode 14. It will be noted that the complete saw-tooth wave form U is never actually applied to the grid of pentode 14 but rather only the upper portion V is amplified and applied to the grid as wave W. If, however, the wave W be reconstructed by extrapolation so as to determine the amplitude of the corresponding complete saw-tooth wave at the input of pentode 14, and if the complete height from peak to valley of this reconstructed saw-tooth wave be designated as P, then the "grid base" or voltage interval from $E_{co}$ to $E_{gc}$ is desirably less than four percent and preferably less than two percent of P. In the curves chosen for illustration, since the wave U is cut in half to produce the wave V, the height of the blanked saw-tooth wave actually applied to the grid of pentode 14 is $$\frac{P}{2}$$

and the grid base is eight percent of this actual height, $$\frac{P}{2}$$

being thus four percent of the height P of the imaginary complete saw-tooth wave corresponding to the actual blanked saw-tooth wave applied to the input of pentode 14. By such proportioning, the width of the upward pulses shown in curve Y is made exceedingly small in comparison to the recurrence interval and therefore the difference between the widths of the upward and downward pulses represented in curve Y is small and will to a considerable extent be masked by the inevitable rounding and broadening of pulses which occurs in transmitting them through any practical circuit. It will be understood, therefore, that the representation of curve Y which shows the positive and negative pulses of substantially different form, is merely intended to clarify the principles involved and is not intended to indicate that any very great difference in width may be apparent. The alternate positive and negative pulses from network 35 are then transmitted through a network comprising a conventional full wave rectifier and a limiter device preferably including amplification. After such full wave rectification and limiting, the pulses will have a similar polarity and amplitude, as can be seen in curve Z of Fig. 2.

The above description of operation, as well as the associated curves W, X, Y, Z of Fig. 2 relates to the operation during the intervals when the speech wave or other modulating signal has substantially its maximum negative value (so that the potential of the speech wave just offsets the potential of battery 34, giving the tip of plug 33 a zero potential with respect to its sleeve). In contrast to the conditions occurring during such time it will be useful to consider the conditions occurring during the opposite extreme of the modulating signal (i. e., when the tip of plug 33 has its maximum positive potential with respect to the sleeve thereof). Operation during the latter condition is illustrated in curves W', X', Y', Z' in the lower part of Fig. 2, these curves being aligned with the corresponding curves W, X, Y, Z for ease in comparison.

The operations of generator 10 and preliminary clipping amplifier 12 are unchanged regardless of the potential of the modulating signal, and consequently the curves U and V apply just as before. Because of the positive potential of the plug tip with respect to its sleeve the control grid of pentode 14 is biased much less positively than before and therefore the applied blanked saw-tooth waves W' are positioned lower with respect to the cut-off level $E_{co}$. In the case chosen for illustration it is assumed that the speech signal voltage added to the voltage of battery 34 gives a resultant negative bias large enough to overcome the positive bias of battery 21 and thus to bring the main control grid potential below zero. Accordingly, curve W' is illustrated as lying predominantly below the threshold $E_{co}$. Actually it is usually preferable to employ a smaller modulating signal so that the grid bias would become a little less positive only and the curve W' would be positioned a little lower than curve W.

The clipping action of the circuit 13 takes place essentially as before thus producing the wave X' in the same manner previously described for the wave X. Because of the different positioning of the curve W' with respect to the two thresholds $E_{co}$ and $E_{gc}$, however, the generally rectangular prominences of wave X' are somewhat narrower than the corresponding ones of wave X. The differentiating network 35 produces curve Y' with alternate upward and downward impulses in the same manner as described for curve Y, but owing to the narrower prominences of curve X' the time interval between each upward impulse and the succeeding one is substantially smaller than for the curve Y. The full wave rectification and clipping action of circuit 36 then brings all of the pulses to similar amplitudes and polarity as illustrated in curve Z' thus producing pairs of pulses whose spacing is somewhat closer than the spacing of the corresponding pairs in curve Z.

After the pulses of curve Z and curve Z' have been produced as described they may be directly transmitted over a wire line or otherwise for communication or other purposes. In the preferred embodiment of our invention these pulses are applied to modulate the radio frequency amplifier 38, thus yielding brief radio frequency wave trains, hereinafter referred to as "carrier pulses." These carrier pulses are then radiated over antenna 39.

It may be that on a purely theoretical basis the inclusion of the preliminary clipping amplifier 12 would not appear essential, since the saw-tooth waves U could theoretically be directly applied to the clipping circuit 13 in place of the blanked waves V. Inclusion of the preliminary clipping amplifier 12, however, is regarded as one of the useful novel features of our invention, since it greatly facilitates the design of equipment for performing the very narrow double clipping action shown and described.

As previously mentioned, it is desirable to minimize the widths of the upward (i. e. negative) pulses of Y and Y' by proportioning the biases and wave amplitudes so that the "grid base" (i. e., the number of volts between the cut-off threshold $E_{co}$ and the grid current threshold $E_{gc}$) is very many times smaller than the theoretical amplitude of the complete saw-tooth wave corresponding to the blanked saw-tooth at the input of the main clipping circuit. If no preliminary clipping amplifier 12 were provided and if it were desired that the grid base should be less than say 2% of the peak-to-peak voltage swing of the complete saw-tooth wave, then it would be necessary to apply to the input of the main clipping circuit a full saw-tooth wave having fifty times the voltage of the grid base. To apply such a large voltage to the input grid of the pentode might require the use of an unnecessarily large tube at this stage; and furthermore the generation of such a large amplitude saw-tooth might require unnecessarily large tubes and large powers for the preceding stages. In accordance with the present invention, however, only a small portion of the whole wave need be employed for transmission through the main clipping circuit since even with the maximum bias shifts caused by the input speech amplifier the positions of the thresholds $E_{co}$ and $E_{gc}$ never shift below the upper half of the wave. The provision of the preliminary clipping amplifier 12 therefore enables the reduction of the power handling capacity and size of the equipment while still enabling the maintenance of a very small ratio between the grid base and the theoretical peak-to-peak voltage swing and the imaginary wave corresponding to the actual input wave of the clipping circuit.

In a preferred form of the invention the speech waves have still smaller amplitude than represented by the curves of Fig. 2 so that the curve W' is only slightly lower than the curve W with respect to the clipping thresholds. It is therefore possible and desirable in accordance with the preferred form of the invention to arrange the clipping amplifier 12 so as to cut off not only the lower half of the saw-tooth wave V but also the upper third thereof thus leaving only one-sixth of the output wave for transmission to the main clipping circuit 13. In the curves chosen for illustration, however, the voltage swing is taken as several times greater than it would actually be in order that the differences between the waves X and X' or between waves Z and Z' may be more readily visible in the drawings.

In the above described embodiment of the invention the pulses produced are time modulated in such fashion that each pair of pulses has one pulse fixed and one pulse which moves in time in accordance with the modulating signal. For many purposes it is desirable that the two pulses should both move in symmetric fashion, one being advanced by the same amount that the other is retarded. In order to achieve this result the wave form applied to the preliminary clipping amplifier 12 may be modified to some symmetric form. One suitable form for this purpose is a simple triangular zigzag which may be generated as shown in Fig. 4. Referring more particularly to the latter figure, 41 is a source of square waves. This source may be of any known type and may, for example, comprise a master sine wave oscillator, a multivibrator synchronized thereby for producing approximately square waves, and a clipping circuit for rendering the waves more perfectly square. The output of such square wave source 41 is applied to an integrating network 42 thus producing zigzag waves of symmetric triangular form. The wave generating arrangement of Fig. 4 may be substituted for elements 10 and 11 in Fig. 1, and in such case the output waves which would be obtained from the rectifying and limiting circuit 36 would have essentially the same form as shown in curves Z and Z' except that the two pulses of a pair would both be of the same width (instead of one being moderately narrow and the other exceedingly narrow) and also the two pulses of a pair would shift equally in opposite directions in response to variations of the modulating signal.

Fig. 5 represents another form of clipping circuit which may be substituted for the clipping circuit 13 of Fig. 1. Instead of employing the two grid thresholds of one single tube for effecting the upper and lower clipping actions, the arrangement of Fig. 5 employs only the cut-off thresholds of two different tubes. Referring more particularly to this figure, the main clipping circuit designated generally as 13' comprises two pentodes 14' and 14'' connected in a conventional two-stage resistance coupled circuit but having a jack 16' included in the control grid return lead of the first pentode. The elements 19', 20', 21', 22', 23', 24', 25' correspond exactly to the similarly numbered elements of previously described clipping circuit 13 while the elements 20'', 21'', 22'', 23'', 24'' and 25'' are corresponding circuit components for the second pentode 14''. Since the grid current threshold $E_{gc}$ is not intended to be used in connection with this type of clipping circuit the screen and plate biases may be made of conventional value even if this makes the grid base comparatively large. In selecting the biases, prime consideration is given to sharpness of the cut-off.

If the input signal wave applied by condenser 19' to the input of pentode 14' is large it may happen that this input signal will sweep past not only the cut-off threshold $E_{co}$ but also the grid current threshold $E_{gc}$. Such action, however, is not harmful provided resistance 26 is included in the grid circuit and condenser 19' made small. The purpose of this resistance is to allow the excursion of the tube grid characteristic for these large voltages with the audio modulation signal. Lacking this resistance, the counter-bias developed across resistance 20' at the moment of grid current flow would act oppositely to the audio signal thus tending to cancel the modulation.

The operation of the clipping circuit is as follows: The input waves applied to the pentode 14' sweep from below to above the cut-off point and thus produce a response which is at first zero and then suddenly rises. Whether or not these waves later pass a comparatively remote grid current threshold is immaterial. The output waves which are, of course, of reversed polarity, are then applied to the second pentode 14'' through the output coupling condenser 24' and there these waves are clipped by the cut-off threshold of the second tube 14''. Because of the inverted polarity of the waves this second clipping (although it removes the negative portions of the waves and passes only the positive portions) will have the effect of cutting off the tips, since the tips of the waves are now negative. Thus the two successive clippings, each of which cuts off the negative portions of the waves, are equivalent to the double clipping action previously described for circuit 13. The biases 21' and 21'' can readily be adjusted to bring the effective clipping levels of the two tubes as may be desired. This is one advantage of this type of circuit.

Instead of employing saw-tooth or triangular waves as the basis for derivation of the time modulated pulses it is possible to employ simple sine waves. The use of such sine waves results in a simple structure and tends to produce more stable time modulation. The use of such sine waves is therefore preferred in all cases where time modulation using small deviations is to be employed or, if larger deviations are employed, where the lack of absolute linearity between the modulating signal and the extent of deviation is not objectionable. The preceding systems described may of course be used with sine wave as a base. A system particularly applicable to sine waves as a basis for deriving time modulated pulses is illustrated in Fig. 6.

Referring more particularly to Fig. 6, 111 is a 10-kilocycle oscillator of high stability producing sine waves which are applied through amplifier 110 and preliminary clipping amplifier 112 to the main clipping circuit 113. This main clipping circuit may be of the type represented by 13 in Fig. 1 or of the type represented by 13' in Fig. 5. For the sake of generality, however, 113 is illustrated as being of a different type employing dry rectifiers instead of pentodes. The two dry rectifiers 114 and 115 are connected back to back and a small positive voltage is applied from battery 119 through resistor 120 to the intermediate point M between them. The resistor 120 is preferably at least several times larger than the low "forward" resistance of the rectifiers, although it should be low in comparison with the high "back" resistance thereof. The input wave from amplifier 112 is applied through coupling condenser 121 to resistor 122 which is preferably several times lower than resistor 120. The output of the circuit is delivered across another resistor 123 which may be of the same order of magnitude as resistor 122. It will be understood that if the following stage has a suitable value of input resistance, resistor 123 may be omitted.

For modulating the clipping action, speech signals from telephone transmitter 130 are supplied over the speech amplifier 131 and transmitter 132 to the plug 133. The battery 134 is in series therewith and for convenience in description this battery may be assumed to have just sufficient potential so that at the maximum negative peaks of the speech wave the tip and sleeve of the plug 133 have the same potential, the tip being positive at all other times.

The output of main clipping circuit 113 is fed to the output portion of the equipment comprising elements 135, 136, 137, 138 and 139 which correspond to the similarly numbered elements of Fig. 1.

The operation of the system shown in Fig. 6 can best be understood by consideration of this figure in conjunction with the curves of Fig. 7. Sine waves from source 111 pass through amplifier 110 and preliminary clipping amplifier 112 and are thus converted into the approximately trapezoidal form shown in curves A and A' of Fig. 7. In the curves of Fig. 7 it is assumed that the upper and lower quarter of the sine wave have been removed by the clipping amplifier 112 so that only the central half remains. Since it is not essential that the clipping action of amplifier 112 be a sharp clipping action giving perfectly square corners the curves A and A' of Fig. 7 have been shown with slightly rounded corners.

The curve A represents conditions when the speech input wave has its maximum negative value so that the total voltage produced by the speech wave and battery together is zero. At this time the main clipping circuit acts just as if the plug 133 were not plugged in. The input wave A is symmetrical with respect to the zero line as shown so that the potential at the left-hand side of the rectifier 114 varies equally above and below ground potential. Because of the rectifying action of element 114 the intermediate point M of the clipping circuit is unable to be raised above its natural or open circuit potential since it cannot receive current through rectifier 114. Thus the potential of point M will follow the input potential only up to the point where the input potential equals the potential of battery 119 plus the voltage drop across R120. Any potential rise beyond this limit (represented in Fig. 7 by a dotted line marked "upper clipping limit") will not be transmitted to point M so that only those portions of curve A lying below such upper clipping limit will pass through to point M. In transmission from point M to the output of the main clipping circuit the rectifying action of element 115 similarly eliminates all potential variations below ground potential, since the point M cannot draw current from the right-hand side of the circuit but can only deliver current thereto. As a result all portions of the curve below the lower clipping limit (i. e., below the zero line) will be blocked and not transmitted to resistor 123.

Therefore, the only parts of curve A which will be transmitted to resistor 123 will be those portions between the two dotted lines marked, respectively, "upper clipping limit" and "lower clipping limit" of Fig. 7. The resulting truncated trapezoidal waves are shown in curve B of Fig. 7. (Actually the corners of such waves will not be perfectly square, but since it is desirable to have the clipping as sharp as practicable the corners are shown in the ideal square form.)

As in the previously described system the clipped waves are next transmitted to differentiating network 135 in which they are converted into alternately positive and negative pulses whose time duration corresponds to the time duration of the sloping sides of the trapezoidal waves of curve B. The waves produced by such differentiation are illustrated in curve C of Fig. 7. The pulses of curve C are desirably less than one-fiftieth of the total cycle interval and preferably less than one per cent. of such interval. Accordingly, the voltage separation between the upper and lower clipping limits associated with curve A should be less than four per cent. of the peak-to-valley voltage swing of the imaginary complete sine wave corresponding to the truncated wave A applied to the main clipping circuit 113, and preferably should be less than two per cent. of this peak-to-valley voltage swing. For facility of illustration, however, the separation between the upper and lower clipping limits is shown somewhat greater than six per cent. of the whole voltage swing, and the duration of the sloping sides of curve B and the pulses of curve C are greater than would be desirable in practice.

The above description of the curves A, B and C relate to the action of the main clipping circuit 113 and the differentiating network 135 during a maximum negative speech wave peak. Corresponding operations during a maximum positive speech wave peak are illustrated in curves A', B' and C' and can readily be understood by comparison with curves A, B and C. During the positive speech wave peaks when the tip of plug 133 is positive with respect to the sleeve thereof, a negative bias is thereby applied through low resistor 122 to the left side of rectifier 114 and thus the truncated sinusoidal input from amplifier 112 is superposed on this negative bias so as the resulting wave A' lies principally below zero potential, as shown in the lower portion of Fig. 7. Accordingly, the trapezoidal wave form B' produced by the clipping action is correspondingly narrow; and the corresponding pairs of pulses of C' are closer together.

The pulse output from the differentiating network 135, whether it has the form of curve C or that of curve C', or some intermediate form, is then applied to the full wave rectifying and limiting circuit 136 which renders the pulses unidirectional and equal as described in connection with Figs. 1 and 2. These rectified pulses are then used to modulate amplifier 138, which is excited by source 137; and the brief carrier pulses thus produced are radiated over antenna 139. Although clipping circuit 113 has been shown in connection with the system in Fig. 6, it will be understood that any one of the three clipping circuits 13, 13' or 113 may be used in either the system of Fig. 6 or that of Fig. 1 (or in the system of Fig. 1 as modified by replacing 10 and 11 with the circuit of Fig. 4). It should also be understood that each of these circuits may be further replaced by its equivalents, for example by substituting electronic diode rectifiers for the dry rectifiers 114 and 115 in circuit 113, or by substituting triodes for the pentodes in circuits 13 and 13'. In fact the system at present believed preferable corresponds to Fig. 6 with electronic diodes substituted for the dry rectifiers illustrated.

Instead of plugging the speech modulating waves into jack 116 of Fig. 6, the plug may be inserted into jack 109 of the amplifier 110. Such amplifier may then be arranged to modulate the wave in any known manner such as by amplitude modulation, phase modulation, or frequency modulation. Preferably, however, amplitude modulation is employed since this will result in the symmetric time displacement of alternate pulses, which is at present considered to be the preferred form of time modulation. If amplitude modulation of the sine waves is effected in amplifier 110, it is then preferable that the incoming wave should be related to the clipping limits in the manner of wave A' rather than in the manner of wave A. Accordingly, battery 140 and switch 141 are provided to enable a negative bias to be applied via resistor 122 when required.

It will be noted that the action of Fig. 6 is essentially the same whether the speech signal be applied to jack 109 for producing amplitude modulation in the foundation wave or to jack 116 for displacing this wave by adding a variable D. C. bias thereto. In both cases the position of the foundation wave is shifted with respect to the clipping limits. If the clipping limits are very close together and are located opposite the center of the foundation wave similar to that as shown by A of Fig. 6, then it is true that amplitude modulation of this foundation wave will not shift the position of the clipping thresholds with respect to the foundation wave by any substantial amount. However, amplitude modulation will vary the slopes of the resultant trapezoid sides. A single differentiation of this wave will produce positive and negative pulses whose widths vary with the modulation but which are not displaced in time. Differentiating the resultant wave a second time and clipping the unwanted negative portion will result in the desired time modulation of pulses. Thus in Fig. 6, by replacing the full wave rectifier of 136 with a second wave differentiating circuit pulses of constant width but modulated in time will be obtained under this condition.

If, on the other hand, the foundation wave is initially offset a substantial amount with respect to the thresholds so that this clipping thresho'd occurs say half way between the center line of the foundation wave and the peak, then it is clear that doubling the amplitude of the foundation wave will displace the thresholds by a substantial amount relative to the foundation wave, so that after such doubling the thresholds will only be one-quarter of the way from the center line toward the peak of the foundation wave. Hence operation will be similar to that described for the preceding system of displacing the clipping level by changing the operating bias.

The exact form of the preliminary clipping amplifiers 12 and 112 in Figs. 1 and 6 have not been considered in detail. These clipping amplifiers may be of any known form and may, for example, be of any one of the forms shown for circuits 13, 13A and 113 in Figs. 1, 5 and 6. If a single threshold clipping is sufficient, as in the case of amplifier 12 in the illustrated embodiment of Fig. 1, the preliminary clipping amplifier may be still simpler in form since the means for effecting the upper level clipping may be omitted.

Although certain specific embodiments of our invention have been shown and described for purposes of illustration it will be clear that any adaptations, alterations or modifications occurring to one skilled in the art, may be made without departing from the scope of the invention as may be defined in the appended claims.

What is claimed is:

1. A time modulation system comprising a source of foundation waves of fixed frequency having a fixed reference axis of amplitude, clipping means connected to receive the waves from said source and adapted to transmit only those portions of said waves which lie between upper and lower limits of a substantially fixed amplitude range while substantially blocking transmission of those portions which lie outside said limits, a source of modulating signals of a lower frequency than said foundation waves, a biasing circuit for said clipping means to normally fix the amplitude level of said range with respect to said axis, and a circuit for applying said modulating signals to said biasing circuit for varying the relative amplitude levels of both said limits with respect to said fixed reference axis of said foundation waves while maintaining said axis at its fixed value.

2. A time modulation system according to claim 1, wherein said clipping means comprises two separate transmission devices each adapted to transmit any signals lying on one side of a given potential level while blocking all signals lying on the other side thereof.

3. A time modulation system according to claim 1, wherein said clipping means comprises two separate grid controlled electron discharge devices each adapted to transmit any signals lying on one side of a given potential level while blocking all signals lying on the other side thereof.

4. A time modulation system according to claim 1, wherein said clipping means comprises two separate rectifiers each adapted to transmit any signals lying on one side of a given potential level while blocking all signals lying on the other side thereof.

5. A time modulation system according to claim 1 wherein said clipping means comprises a single grid controlled electron discharge device having means for biasing said device so as to exhibit saturation effects at the upper limit within the working range but above its cut-off threshold.

6. A time modulation system according to claim 1 wherein said clipping means comprises a single grid control electron discharge device having means for biasing said device so as to exhibit saturation effects at an upper limit less than .08P, where P is the peak-to-valley voltage swing of the imaginary complete foundation wave corresponding to the clipped wave actually applied to said electron discharge device.

7. A time modulation system according to claim 1 wherein said clipping means comprises an electron discharge device having means for biasing said device so as to exhibit saturation effects at an upper limit within the working range but above its cut-off threshold, and wherein said means under the control of said modulating signals for varying said limits includes means for varying the amplitude of said foundation wave while maintaining a given potential level for said limits whereby the output of said amplitude range corresponds to a variable relative positioning of said foundation wave with respect to said limits.

8. A time modulation system according to claim 1 wherein said means under control of said modulating signals for varying both said limits includes means for varying the amplitude of said foundation wave while maintaining a given potential level for said limits whereby the output of said amplitude range corresponds to a variable relative positioning of said foundation wave with respect to said limits.

9. A time modulation system comprising a source of foundation waves of fixed frequency having a fixed axial potential position, first clipping means adapted to transmit only those portions of said waves which lie on a given side of a predetermined threshold while substantially blocking transmission of those portions which lie on the other side of said threshold, second clipping means connected to receive the clipped waves from said first clipping means and adapted to transmit only those portions of said waves which lie between upper and lower limits of substantially fixed amplitude range while substantially blocking transmission of those portions which lie outside said limits thereby producing substantially rectangularly shaped waves, means for differentiating the waves transmitted from said second clipping means to produce pulses of alternate polarity timed according to the leading and trailing edges of said rectangular waves, a full wave rectifier and clipping circuit to translate the alternate positive and negative pulses into pulses of common polarity and amplitude, a source of modulating signals of a lower frequency than said foundation waves, and means under the control of said modulating signals for varying simultaneously the relative relationship of both said limits with respect to said fixed reference axis of said foundation waves while maintaining said axis at its fixed value.

EMILE LABIN.
DONALD D. GRIEG.

REFERENCES CITED

The following references are of record in the file of this patent:

UNITED STATES PATENTS

| Number | Name | Date |
|---|---|---|
| 1,655,543 | Heising | Jan. 10, 1943 |
| 2,061,734 | Kell | Nov. 24, 1936 |
| 2,086,918 | Luck | July 13, 1937 |
| 2,113,214 | Luck | Apr. 5, 1938 |
| 2,227,596 | Luck | Jan. 7, 1941 |
| 2,280,707 | Kell | Apr. 21, 1942 |
| 2,266,541 | Foster et al. | Dec. 16, 1941 |
| 2,105,538 | Landon | Jan. 18, 1938 |
| 2,208,422 | Hugon | July 16, 1940 |